United States Patent
Panning et al.

(10) Patent No.: US 6,802,979 B2
(45) Date of Patent: Oct. 12, 2004

(54) COMPOSITION AND METHOD FOR TREATING POLLUTED WATERS AND WATER SEDIMENTS

(76) Inventors: Frank Panning, Virchowstrasse 12, 15366 Dahlwitz-Hoppegarten (DE); Klaus Kretschmer, Mittelstrasse 14a, 13055 Berlin (DE); Berit Hillbrecht, An der Katholischen Kirche, 15366 Dahlwitz-Hoppegarten (DE)

( * ) Notice: Subject to any disclaimer, the term of this patent is extended or adjusted under 35 U.S.C. 154(b) by 194 days.

(21) Appl. No.: 10/148,619

(22) PCT Filed: Nov. 30, 2000

(86) PCT No.: PCT/EP00/12041

§ 371 (c)(1), (2), (4) Date: May 31, 2002

(87) PCT Pub. No.: WO01/40120

PCT Pub. Date: Jun. 7, 2001

(65) Prior Publication Data

US 2002/0179539 A1 Dec. 5, 2002

(30) Foreign Application Priority Data

Dec. 3, 1999 (DE) ......................... 199 58 271

(51) Int. Cl.[7] .................................................. C02F 1/72
(52) U.S. Cl. ....................... 210/717; 210/721; 210/758; 252/186.1
(58) Field of Search .............................. 210/716, 717, 210/721, 723, 749, 758, 759, 763, 906, 912; 252/186.1

(56) References Cited

U.S. PATENT DOCUMENTS

| | | | | | |
|---|---|---|---|---|---|
| 4,293,426 A | * | 10/1981 | Gago | .......................... | 210/759 |
| 4,696,749 A | * | 9/1987 | Habermann et al. | ......... | 210/721 |
| 5,204,008 A | * | 4/1993 | Diehl et al. | .................. | 210/759 |
| 5,207,925 A | * | 5/1993 | Steiner et al. | .............. | 210/746 |
| 5,384,036 A | * | 1/1995 | Fyson | .......................... | 210/724 |
| 5,500,131 A | | 3/1996 | Metz | ........................... | 210/705 |
| 6,059,973 A | * | 5/2000 | Hudson et al. | .............. | 210/610 |
| 6,332,986 B1 | * | 12/2001 | Johnson et al. | ............. | 210/758 |

FOREIGN PATENT DOCUMENTS

| | | |
|---|---|---|
| DE | 19 07 359 | 8/1970 |
| DE | 34 30 484 | 2/1986 |
| DE | 38 38 864 | 5/1990 |
| DE | 40 05 064 | 8/1991 |
| JP | 58212792 | 6/1985 |

* cited by examiner

Primary Examiner—Frank M. Lawrence
(74) Attorney, Agent, or Firm—Norris McLaughlin & Marcus PA

(57) ABSTRACT

A composition having a depot effect and a method for treating polluted waters and water sediments such that constituents that are hazardous to water are essentially decomposed or bound. Microbiological decomposition processes are long-term supported and water quality is improved without adding salt or decreasing the pH value. The composition contains one or more compounds which are produced by converting iron(III) nitrade and/or aluminium nitrade and hydrogen peroxide in the presence of a base and release oxygen and/or nitrations as oxygen donors in a prolonged manner when contacting water.

21 Claims, No Drawings

COMPOSITION AND METHOD FOR TREATING POLLUTED WATERS AND WATER SEDIMENTS

BACKGROUND OF THE INVENTION

The invention relates to a composition and method for treating polluted waters and water sediments as described herein.

Treatment of waters and revitalizing natural bodies of water is increasingly important. The influx of nutrients from domestic and industrial waste water, detergents and rinse agents, sewage, chemical fertilizer, etc., which increases from year to year, as well as the increasing acidity of the water due to acidic inflow disturbs the natural balance of the waters and impedes the natural self-cleaning ability of the waters.

As a result, pollutants and nutrients build up in the waters and in the water sediments. These processes can cause dramatic shifts in the population of species in the entire ecosystem. This causes large variations in the oxygen content in the water body and an oxygen deficiency in the water layer close to the sediment and/or in the sediments themselves, accompanied by a remobilization of nutrients and pollutants.

Conventional techniques use flocculation with Fe(III)-salts and aluminum salts for removing water ingredients. Water ingredients which are unaffected by precipitation processes can be removed by inclusion in or absorption on the flake. DE-AS 19 07 359 discloses the use of aluminum sulfate and chloride, Fe(II)- and Fe(III)-sulfate, Fe(II)- and Fe(III)-chloride and the like. The generated flakes, however, can have a sedimentation characteristic that is inadequate for natural bodies of water; in particular, iron salts have a tendency for forming colloidal precipitates.

Disadvantageously, the flocculation means can leave anions in the water which can increase the salinity and acidity of the water. Also used are base metal salts of the chemical formula Mn $(OH)_m X_{3n-m}$, wherein M represents Fe(III) and aluminum, and X is a monovalent anion; in addition, a polyvalent anion Y of a divalent or polyvalent acid (for example, phosphoric acid, silicic acid, chrome acid, carbonic acid, sulfuric acid) with a very small mole ratio was introduced in the compound (DE-AS 19 07 359).

The application of flocculation means of this type for the purpose of restoring lakes has not been successful, because the size of the generated flakes caused lasting damage to the plankton population.

To eliminate the disadvantages associated with the increased salinity and acidity of the water, it was proposed to add Fe(III)- and/or aluminum nitrate to the water and to subsequently reduce the nitrate ions to molecular nitrogen. This reduction can take place, for example, by denitrification (DE 38 38 864).

The method was developed, in particular, to satisfy the requirements for waste water treatment. The employed nitrates dissolve well in water; however, no sedimentation of the nitrate ions should be expected. Since the matter to be treated with nitrate are predominantly resting organisms, the substrate and the biomass have to be kept in constant contact with each other.

U.S. Pat. No. 5,500,131 discloses treating water with calcium carbonate (lime) and metal salts as flocculation means. The metal salt used are aluminum- and iron-chlorides, -sulfates and nitrates.

The use of the products for an effective treatment, however, is limited to the water body itself. The sedimented flakes form a gas-permeable membrane on the sediment surface and simultaneously acts as a cover layer. The break-down of organic sediments itself is only slightly enhanced.

Also known is the treatment of the sediments on the bottom of bodies of water with lime and fermentation fungi with additional aeration of the sludge (JP 60-106 592 A). Although this enhances the break-down processes, the introduction of foreign organisms almost always carries with it a substantial risk for the ecosystem and requires lengthy approval processes.

DE-40 05 064 C describes treating water sediments with FeO, $Fe(OH)_2$ and/or $Fe(OH)_3$ under addition of oxygen and motion. This approach enhances the biological break-down and binds phosphates and hydrogen sulfite. The hydrogen sulfite can be reduced in the presence of a sufficient amount of oxygen to elemental sulfur, which then precipitates on the bottom of the waters.

This treatment typically requires agitating the water to introduce oxygen which can swirl and displace the sludge on the bottom of the waters. The process is limited by the oxygen saturation limit of the water and/or by the large amount of mechanical energy required to agitate the water.

DE 34 30 484 A1 describes a method for an oxidizing treatment of waste water with specially activated carbon carriers that include Fe(III) $(NO_3)_3$ and with $H_2O_2$ as oxidant. The carbon carrier is activated by anodic oxidation in mineral acids. The formation of nitrate-containing amorphous iron-oxihydrate structures should be prevented. No macro-porous flake structure is formed.

SUMMARY OF THE INVENTION

It is an object of the invention to provide a simple and effective method and a composition for the treatment of waters and water sediments, which can reduce or bind ingredients that pollute the water to the greatest possible extent, can promote long-term microbiological reduction processes, and can improve the water quality, without increasing the salinity or decreasing the pH value of the water. In particular, phosphates and heavy metal ions should be rendered harmless and/or their ecological toxicity reduced.

DETAILED DESCRIPTION OF THE PREFERRED EMBODIMENTS

The object is solved by the invention described herein. The composition of the invention is characterized in that it contains one or more compounds which are produced by reacting Fe(III) nitrate and/or aluminum nitrate and hydrogen peroxide in the presence of a base, and which release over a long period of time oxygen and/or nitrate ions as oxygen donors upon oontact with water.

The compositions according to the invention have not only a high absorbency for nutrients and pollutants, but also a depot effect for oxygen and oxygen donors.

The composition according to the invention contains modified Fe(III)- and/or aluminum-containing compounds with depot properties.

It has been observed that Fe(III)- and/or aluminum-containing compounds are formed by reacting Fe(III) and/or aluminum nitrate with hydrogen peroxide in the presence of a base. The formed compounds have a large specific surface area and include in their structure oxygen in form of a depot. The nitrate ions act as oxygen donors.

Surprisingly, the fabrication method of the invention promotes inclusion of nitrate ions and oxygen in the structure of the composition in such a way that they are slowly released in the waters and particularly on and in the water sediment.

The successive release of oxygen and nitrate ions provides these oxygen and nutrient sources to the microorganisms over a longer time, which promotes the biological break-down processes in the waters and the water sediment and increases their effectiveness.

The nitrate ions are hereby completely reduced to oxygen and nitrogen, which eliminates the accumulation of nitrates in the waters and water sediment. The oxygen released by the biological processes is available to the microorganisms, while the nitrogen escapes.

The released oxygen and the nitrate ions can also aid through oxidation in the removal of organic pollutants that are present in the waters or the water sediments. Anaerobic processes that cause the formation of $H_2S$ are suppressed.

The successive release of oxygen and nitrate ions have another important advantage of promoting oxidizing reactions which can regenerate suitable binding partners for pollutants and nutrients, thereby increasing the binding and retention capacity of the Fe(III)- and/or aluminum-containing compounds.

The successive release of oxygen and nitrate ions prevents the reduction of Fe(III)-ions to Fe(II)-ions which is ineffective for the binding and attachment processes. These processes also increase the binding capacity of the composition of the invention for pollutants and nutrients, in particular, for phosphates and heavy metals.

In addition, with the composition of the invention, sulfide ions are bound in a water-insoluble form. The sulfur is herein precipitated as iron sulfide and immobilized in the sediment. This can significantly reduce the toxicity and odor emission from $H_2S$. These conventional processes are affected by the composition of the invention in that the oxygen, which is successively released from the composition, causes a further reduction of the iron sulfides to elemental sulfur which deposit in the sediment. Since the iron released from the sulfide is available as a binding partner for additional binding and precipitation processes, the capacity and the effectiveness of the binding and/or attachment of pollutants and nutrients is significantly enhanced.

The compositions of the invention also bind the phosphate ions which are present in the water and/or sediment in form of Fe(III)- and/or aluminum phosphate. The bound phosphates deposit in the water sediment and are then no longer accessible to the producers (algae) to support their metabolism. The heavy metals are also irreversibly incorporated in the structure of the modified Fe(III)- and/or aluminum-containing compounds of the invention or absorbed thereon, which reduces their ecological toxicity.

The macro-porous flake structure of the composition of the invention is particularly advantageous for these processes due to its significantly greater absorptive surface area and improved sedimentation properties in comparison to the Fe(III)- and aluminum-salts, which are known in the art as flocculation means.

This significantly increases the capacity and effectiveness for binding pollutants and nutrients.

The condensation progresses while the hydrogen ion concentration decreases due to the dilution of the solution with water or the addition of the base, until three-dimensional high-molecular colloidal condensates (network structure) of the overall composition $(FeOOH)_x \times H_2O$ form, which are less and less soluble and finally precipitate as agglomerates in the form of large flakes.

Due to the particular structure of the compositions of the invention, ingredients in the water can be removed which cannot be bound with the conventional precipitation means, such as bulky forms of algae.

Moreover, the composition of the invention—due to its structure—forms an excellent substrate for the settlement of microorganisms and therefore also supports the biological cleaning effect.

By binding and attaching the nutrients, in particular phosphates, the algae are deprived of an essential basis for growth, which prevents the development of algae masses. Moreover, reductive hostile environmental factors are eliminated in the long run due to the successive releases of oxygen.

It was also found that the compositions according to the invention form a skeletal-like structure for the treatment of water and water sediments.

The depot effect, however, is not limited to oxygen and nitrate ions. Additional compounds, for example sulfates such as iron sulfate, can be added as oxygen donors in the manufacturing process. Other sulfate ions, such as $CaSO_4$ or $MgSO_4$, can be added, which represent compound that occur naturally in the waters. However, no more than 50 wt. % sulfate ions should be added, based on the nitrate ions present in the waters.

Moreover, additives which may be useful for water restoration of a specific body of water can be added in the manufacturing process or form in the manufacturing process from the corresponding starting materials. One example is the addition of $CaCO_3$ to the water or the sediment.

These polar compounds are likewise included into the skeletal structure of the Fe(III)- and/or aluminum-containing compound and also successively released in the water and/or the water sediment.

This makes feasible the application of the compounds of the invention for a comprehensive and lasting restoration of bodies of water without the need for additional treatment steps. The composition of the invention is produced by reacting Fe(III)- and/or aluminum nitrate with hydrogen peroxide in the presence of a base.

The reaction advantageously takes place at a pH value above 6, preferably at a pH value between 7 and 10, whereby the pH value is adjusted by using a base.

The hydroxides of monovalent, divalent and/or trivalent metals, in particular calcium, magnesium, sodium and potassium, are used as a base.

Preferably, calcium hydroxide and magnesium hydroxide are used, since these bind any carbonates, sulfates and phosphates already present in the water by forming difficult to dissolve precipitates.

The reaction can advantageously take place in the presence of conventional oxidation catalysts.

Optionally, the composition of the invention can be produced in the presence of supplementary additives required for the restoration of waters. Depending on the water quality and the task at hand, $CaCO_3$ can be added during manufacture, for example, to enhance the buffering capacity of the system.

For example, additional phosphates, amino acids, fatty acids, and humine acids can be extracted from the water body by initiating the water-internal calcite precipitation, thus significantly enhancing the capacity of the sediments to bind nutrients.

The compositions produced according to the invention have the ability to sediment relatively quickly after being introduced in the water and to absorb nutrients on their sedimentation path. They initially form a barrier layer on the sediment surface against the phosphate that is remobilized from the sediment. In a subsequent step, the remobilized phosphate attaches to the amorphous iron, aluminum or calcium surfaces. During the gradual invasion into the water sediment, oxygen and nitrate ions slowly desorb and thereby provide to the microorganisms the sources of oxygen required for aerobic breakdown processes.

Reductice processes that cause the formation of $H_2S$ and mobilize heavy metals are thereby eliminated.

Any residual quantities of hydrogen peroxide do not interfere with the desired processes, but rather support the breakdown of the hazardous substances in the water and the water sediment through oxidation.

The compositions of the invention are used for treating waters and water sediments loaded with nutrients and pollutants.

They are produced by a simple manufacturing process according to the invention and added to the water in a single step without the need for additional processing, purification, separation and the like. Due to the simple technology and low energy cost both for producing the composition and for the water treatment, the entire process for treatment of waters and water sediment loaded with nutrients and pollutants becomes quite simple and very effective.

By treating the water and water sediment with the compositions of the invention, phosphates are immobilized, sulfates are bound, heavy metals are converted into compounds that are less toxic for the environment, and microbiological breakdown processes are promoted. This does not increase the salinity or acidity of the water.

What is claimed is:

1. Composition with a depot effect, wherein the composition comprises one or more compounds, which are produced by reacting Fe(III) nitrate and/or aluminum nitrate and hydrogen peroxide in the presence of a base and the composition releases oxygen and/or nitrate ions as oxygen donors upon contact with water over a long period of time.

2. Composition of claim 1, wherein during the reaction between Fe(III) nitrate and/or aluminum nitrate and hydrogen peroxide, sulfate ions are also added at most 50 wt. % based on the nitrate used.

3. Composition of claim 1, wherein the hydroxides of monovalent, divalent and/or trivalent metals are used as the base.

4. Composition according to claim 1, wherein calcium hydroxide and/or magnesium hydroxide are used as the base.

5. Composition according to claim 1, wherein the reaction takes place at a pH value above 6.

6. Composition according to claim 1, wherein the reaction takes place in the presence of oxidation catalysts.

7. Composition of claim 1, wherein the reaction takes place in the presence of additives.

8. Composition according to claim 1, wherein the reaction takes place in the presence of carbonates and/or sulfates.

9. Method for treatment of polluted waters and water sediments, comprising reacting Fe(III) nitrate and/or aluminum nitrate and hydrogen peroxide in the presence of a base to obtain a suspension containing Fe(III)- and/or aluminum-containing compounds, and introducing the suspension into the water and/or the water sediments.

10. Method of claim 9, wherein during the reaction between Fe(III) nitrate and/or aluminum nitrate and hydrogen peroxide, sulfate ions are also added at most 50 wt % based on the nitrate used.

11. Method of claim 9, wherein the hydroxides of monovalent, divalent and/or trivalent metals are used as the base.

12. Method according to claim 9, wherein the reaction takes place at a pH value above 6.

13. Method according to claim 9, wherein the reaction takes place in the presence of oxidation catalysts.

14. Method of claim 9, wherein the reaction takes place in the presence of additives.

15. Method according to claim 9, wherein the reaction takes place in the presence of carbonates and/or sulfates.

16. Composition of claim 3, wherein the hydroxides of calcium, magnesium, sodium, and potassium are used as the base.

17. Composition according to claim 5, wherein the pH value is between 7 and 10.

18. Composition of claim 7, wherein the additives are materials that are known to restore waters.

19. Method of claim 11, wherein the hydroxides of calcium, magnesium, sodium, and potassium are used as the base.

20. Method of claim 12, wherein the pH value is between 7 and 10.

21. Method of claim 14, wherein the additives are materials that are known to restore water.

* * * * *